United States Patent [19]

Carter et al.

[11] 4,148,399

[45] Apr. 10, 1979

[54] BALE HANDLING APPARATUS

[76] Inventors: Jackie L. Carter; Jerry D. Carter, both of Unionville, Mo. 63556

[21] Appl. No.: 752,151

[22] Filed: Dec. 20, 1976

[51] Int. Cl.² ............................................. B65H 75/40
[52] U.S. Cl. ............................... 414/732; 242/86.5 R; 414/731
[58] Field of Search ................. 214/147 G, 77 R, 731, 214/147 R, 1 HA, 1 HH, 77 R; 242/86.5 R

[56] References Cited

U.S. PATENT DOCUMENTS

| | | | |
|---|---|---|---|
| 3,110,477 | 11/1963 | Campbell | 214/147 G X |
| 3,325,118 | 6/1967 | Hall | 242/86.5 R |
| 3,908,846 | 9/1975 | Brummitt | 214/147 G |
| 4,032,184 | 6/1977 | Blair | 214/147 G X |
| 4,044,963 | 8/1977 | Hostetler | 214/147 G X |

*Primary Examiner*—Albert J. Makay
*Assistant Examiner*—George F. Abraham
*Attorney, Agent, or Firm*—Glen Simmons

[57] ABSTRACT

The invention relates to an apparatus for lifting, handling, transporting and unrolling large round hay bales. Preferably said apparatus is employed on the bed of a pickup or truck and includes a frame mounted on the pickup bed with a beam pivotally mounted thereon and with arms slidably mounted on the beam. The arms have bale penetrating members rotatably mounted or fixed thereon. First power actuated means operably pivot said beam in an arc about the rear end of the pickup toward and away from the ground. Second power actuated means slide the arms and penetrating members along said beam toward each other in such fashion as to squeeze a bale sufficiently to allow the first power means to lift the bale from the ground, and away from each other to release the bale. The bale penetrating members are rotatably or fixedly mounted on the arms to allow a bale to be unrolled to facilitate feeding the hay of the bale to animals.

4 Claims, 3 Drawing Figures

U.S. Patent    Apr. 10, 1979    Sheet 1 of 2    4,148,399

BALE HANDLING APPARATUS

BACKGROUND OF THE INVENTION AND OBJECTS

With the advent of the large round balers and stackers it has become necessary for farmers and ranchers to provide powered mechanical means to lift, transport, handle and unroll or distribute hay from the bales and stacks. Various devices have been built and used in an attempt to deal with the large round bales which are four to six feet in diameter, approximately five to six feet in length and usually weigh in the range of six hundred to one thousand eight hundred pounds. One of these devices is the widely used "spike" loader which has been in use since mid 1973 and which is comprised of a spike of heavy metal mounted on a hydraulic or winch lift on the rear of a pickup, truck or tractor. The spike is simply pushed by the associated vehicle into the core of a round bale, then lifted by winch or hydraulic mechanism and carried by the vehicle to the place of feeding or storage. The spike concept has further been used on front end loaders (see U.S. Pat. No. 3,921,837 cl. 214/145). Further, devices such as disclosed in U.S. Pat. No. 3,908,846 (214/147) provide for squeezing a bale with penetrating members which swing into a bale from hinged mounting positions preparatory to lifting. The latter system further provides for unrolling a bale. A problem with the arrangement is that the design is insufficient to withstand the stresses created during the unrolling of a bale while crossing a ditch or low place. A further device for handling such bales is that shown in U.S. Pat. No. 3,880,305 (214/147) which provides powered pivotal swing arms with bale penetrating members mounted thereon and with the arms mounted on an upright frame adapted for use on the rear of a tractor. Other systems provide for plural lifting/moving means to aid in the accommodation of plural bales on a truck. An example of this system is shown in U.S. Pat. No. 3,820,673 (214/77).

Accordingly, it is an object of this invention to provide a device for handling of large round bales which is simple, sturdy and reliable in nature.

A further object of this invention is the provision of a large round bale handling device for mounting on the rear of a pickup which may be operated from the pickup driver's seat.

A further object is the provision of a large round bale handling device for mounting on the rear of a pickup which enables the pickup operator, from his seat in the cab, to load and carry away two large round bales per trip.

A further object is the provision of a large round bale handling device which is adapted for use on a pickup and which enables the operator of a pickup from the driver's seat to load, carry away and unload on the ground or into a feeder a large round bale or unroll and distribute the hay from a large round bale.

A further object of the invention is the provision for lifting and transporting a large round bale by the use of power actuated arms mounted on a beam which pivots in an arc about the rear end of the bed of a pickup toward and away from the earth; which beam and arms may be stopped in any position along the arc of movement.

A further object of the invention is the provision for lifting and transporting large round hay bales by the use of power actuated arms slidably mounted on a beam which pivots in an arc about the end or side of a vehicle toward and away from the earth with said arms being slidable toward and away from each other along said beam for grasping and releasing a bale therebetween.

With these objects in view, as well as other objects which will become apparent from the specification, reference will be had to the accompanying drawings wherein.

DESCRIPTION OF THE PREFERRED EMBODIMENT

Figure 1:
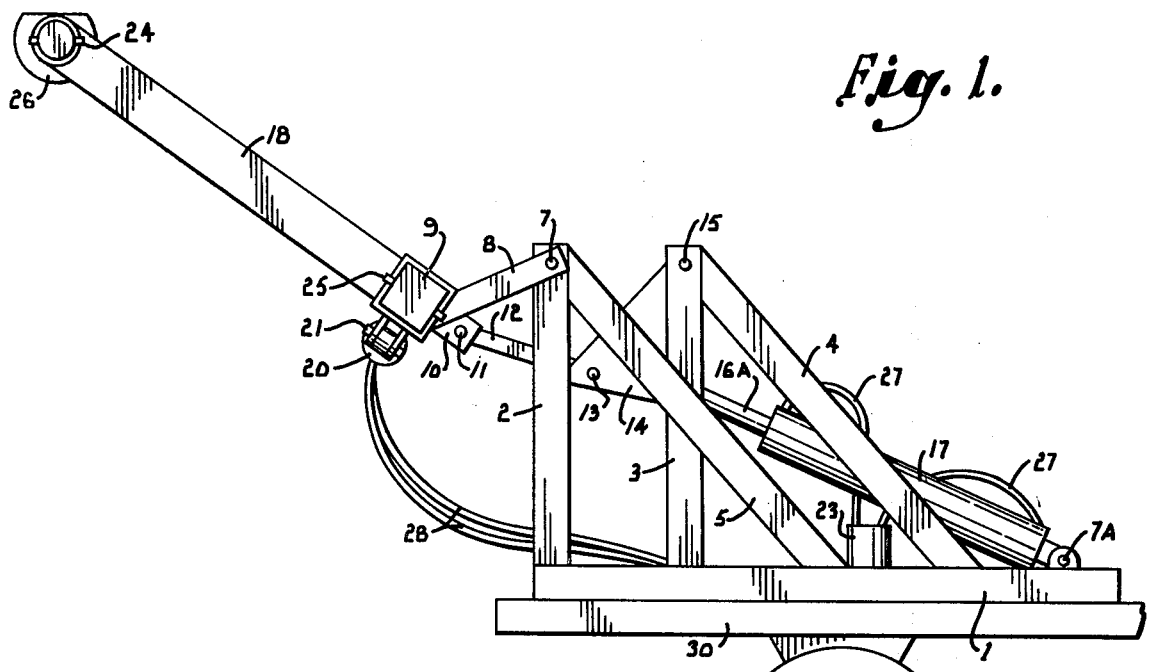
FIG. 1 is a side elevation view of the bale handling apparatus of the present invention mounted on the rear of a pickup or truck bed.
Figure 2:
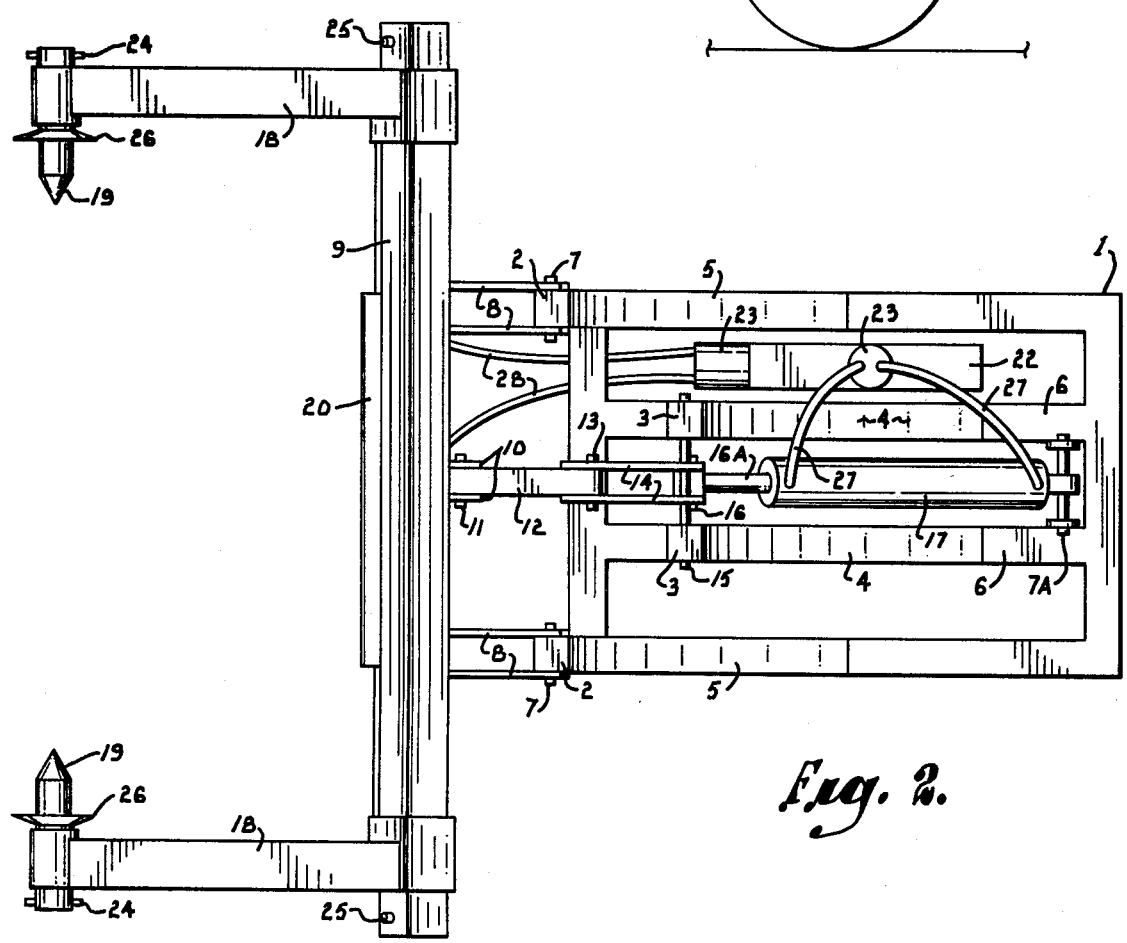
FIG. 2 is a top plan view of the bale handling apparatus alone.

Referring in more detail to the drawings wherein like parts are consistently numbered and wherein there is shown in FIGS. 1 and 2 the preferred embodiment having a frame with a base portion 1 in the form of a rectangle with portions 6 welded there within in a lengthwise manner and which is mounted flat on the rear end of a pickup or truck bed 30. Welded to base 1 and 6 are upright frame portions 2 and 3 which are stabilized by frame braces 4 and 5 of which braces 5 are welded to 1 at the lower end and to frame uprights 2 at the upper end thereof while braces 4 are welded at their lower ends to frame portions 6 which lie flat on the pickup or truck bed and in the plane of 1 with portions 6 being welded at their extremities to rectangle base portion 1 as noted above. The upper ends of braces 4 are welded to the upper ends of uprights 3.

Pivotally mounted by pin connection at 7 on uprights 2 are supports 8 for beam 9 with supports 8 being welded to beam 9.

At the mid-portion of beam 9 are struts 10 welded thereto. Pin connected to 10 at 11 is connecting element 12, the other end of which is pin connected to linkage 14 at 13. Linkage 14 is pivotally mounted at 15 to the top of frame uprights 3. Pin connected to linkage 14 at 16 is the plunger 16A of hydraulic cylinder 17 which has its other end pin connected to frame portion 6 at 7A.

Figure 3:
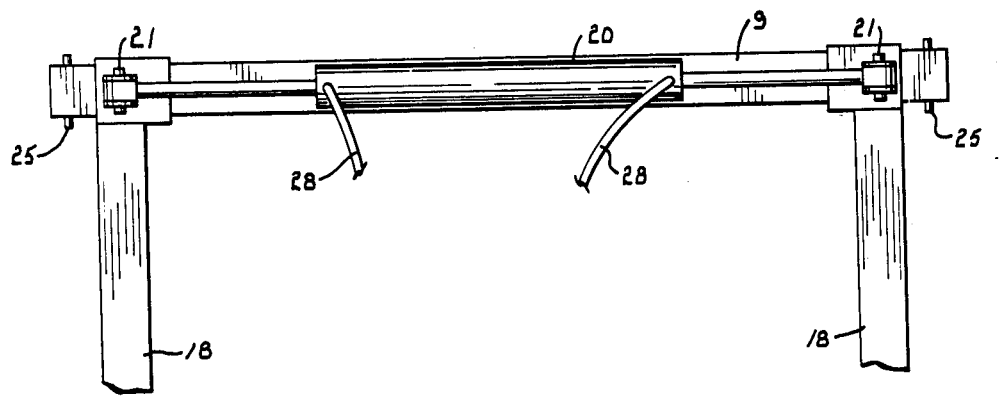
FIG. 3 is a bottom view of beam 9 and associated arms 18 of the invention.

Slidably mounted on beam 9 are arms 18 (not drawn to scale with respect to frame 1 in FIG. 2) on which are mounted spikes 19 for penetration of a large round bale. As best seen in FIG. 3 arms 18 are connected by a hydraulic cylinder 20 via pin connections 21. Cylinder 20 is located on the bottom side of beam 9 for reasons of protection.

Hydraulic cylinders 10 and 17 are supplied by an electric motor driven hydraulic pump unit 22 which includes a fluid reservoir. Control of the cylinders 20 and 17 is by solenoid-operated valves 23 which control the direction of flow of pressurized fluid between said cylinders and the motor-pump unit 22. The solenoid-operated valves 23 are each controlled by a separate electric switch (not shown) located in the cab of the pickup/truck on which the invention is employed. The switches operate such that when pushed in one position a circuit is closed to energize 22 and the respective solenoid valve such that pressurized fluid from unit 22 causes the associated cylinder to extend, while in the other switch position, the cylinder via unit 22 and associated valve is caused to retract. The switches, solenoid-operated valves, electric motor-pump unit as well as associated connecting hoses and cylinders are all commercially available items which may be purchased from, for example, the Monarch Road Machinery Company in Grand Rapids, Michigan.

Frame portions 1, 2, 3, 4, 5 and 6 are made from approximately three inch square cross section hollow steel while beam 9 and arms 28 are approximately 4 inch square cross section hollow steel.

Spikes 19 may be either fixedly mounted to the ends of arms 18 or rotably mounted as within cylindrical cross openings at the ends of arms 18. In the latter arrangements, spikes 19 are made of a cylindrical form of diameter less than the openings in arms 18 with spikes 19 being pinned at 24 to allow rotation but to prevent lateral movement. With respect to beam 9, pins 25 are placed there through at the extremities to prevent arms 18 from sliding off the ends of 9 as they are being moved by cylinder 20. Discs or partial discs 26 may be placed on spikes 19 which are mounted on arms 18 to serve as stand-offs.

Spikes 19 which are on the order of six inches to one foot in length as stated above, may be rigidly attached to arms 18. Experience has shown that a bale may be unrolled from the rigidly mounted spikes as well as from those rotably mounted.

Cylinder 17 is connected with one of the valves 23 via hydraulic lines 27 while cylinder 20 is connected with one of the valves 23 via hydraulic lines 28.

Motor-pump unit 22 is powered via the above discussed switches not shown from the associated vehicle's electrical system such as, for example, the 12 volt system presently employed on most trucks and pickups.

OPERATION

When the operator desires to move a bale, the vehicle upon which the device of the invention is mounted is backed up to the bale with arms 18 in the position where they are widely separated from each other by cylinder 20 under the switch control of the operator. When the carrier vehicle is in position such that spikes 19 can then be positioned by cylinder 17 to a point adjacent the center of the end of a round bale, cylinder 20 is energized via 22 and 23 to pull arms 18 toward each other driving spikes 19 into the core or axis of the round bale. When the operator observes that spikes 19 have penetrated to the extent necessary for supporting a bale, then the operator energizes cylinder 17 via 22 and 23 which pushes linkage 14, connecting element 12 and this beam 9 such as to force the latter in an upward arc carrying the bale which is supported via 19. The beam 9 may be positioned for carrying a bale at any point from that sufficient to lift a bale off the ground or other resting place to a position forward of verticle. An advantage of the invention is that one bale may be raised by arms 18 and spikes 19 via cylinder 17 to a position forward of 17 in the pickup or truck bed and deposited there i.e., a bale is picked up by 18 and 19 swung in an upward arc past the vertical position of 18 to a point where the lifted bale comes to rest on the truck/pickup bed forward of cylinder 17 and base 1. The bale is then released by the sliding of 18 further apart by 20 after which another bale is grasped by arms 18 and spikes 19 and lifted such that it leaves the ground.

Thus, at least two bales may be carried per trip on the vehicle on which the invention is mounted.

Upon arrival where the bales are to be deposited, the operator may either unload both bales by operating the device in reverse order to that of loading or may unroll one or more of the bales by lowering a bale clutched between 18 on spikes 19 to the point when the bale just touches the ground. The operator then slowly drives the vehicle forward while gently lowering arm 18 as the bale unrolls. This is, of course, continued until all the bale is unrolled to facilitate animal feeding.

Arms 18 may, of course, be moved together and apart by power means other than a hydraulic cylinder such for example as by power drive threaded shaft extending through threaded receivers in arms 18 such that as the threaded shaft is turned in one direction, arms 18 are drawn together while being separated when the screw is driven in the opposite direction. Further, a cable drive could be employed to move arms 18 using the principal employed to draw draperies apart and together. Likewise, beam 9 could be operated by a constantly tensioned cable arrangement or power driven screw arrangement.

While the device has been described as operating from the rear of a pickup or truck, it could, of course, be operated on the front or side of any vehicle adapted or adaptable for the carrying of large hay bales, all within the purview of the invention.

What we claim and desire to protect by Letters Patent is:

1. A device for handling large round hay bales comprising:
   (a) a vehicle having a bed thereon;
   (b) a rectangular shaped frame means mounted on said bed; said frame further having two bar means positioned within said rectangular shaped frame means and in parallel relationship to the longitudinal sides of said frame means and connected to the end portions of said rectangular shaped frame;
   (c) a first plurality of upright means mounted in contact with and extending upwardly from said rectangular shaped frame means at one end thereof;
   (d) a second plurality of upright means mounted on said two bar means and extending upwardly therefrom;
   (e) linear beam means having plural strut means mounted thereon with said strut means being pivotally mounted on the upper portion of said first plurality of upright means;
   (f) plural arm means slidably mounted on said beam means;
   (g) first power actuated means for moving said plural arm means toward and away from each other;
   (h) triangular shaped linkage means pivotally mounted on said second plurality of upright means;
   (i) connecting means connecting a first point of said triangular shaped linkage means to said beam means;
   (j) second power actuated means for moving said beam means along an arc as it pivots about said upper portion of said first plurality of upright means; said second power actuated means having one end thereof pivotally connected between said two bar means and another end thereof pivotally connected to a second point of said triangular shaped linkage means.
   (k) friction means in spear form rotatably mounted on each of said arm means for deforming a large round hay bale as said arms are moved toward each other with said hay bale located therebetween, whereby a large round hay bale once raised on said rotatably mounted friction means via said second second power actuated means can be unrolled therefrom for feeding.

2. The device of claim 1 wherein said first and second power actuated means are hydraulic cylinders.

3. The device of claim 1 wherein said plural arm means are slidably mounted in parallel relation to each other on said beam means.

4. The device of claim 2 wherein said first power actuated means is connected to said plural arm means and is mounted in parallel relationship, outside of, but in proximity to, said beam means.

* * * * *